United States Patent
Chen et al.

(10) Patent No.: US 9,024,532 B2
(45) Date of Patent: May 5, 2015

(54) DIRECT TYPE LED BACKLIGHT AND LIQUID CRYSTAL DISPLAY THEREOF

(71) Applicant: Shenzhen China Star Optoelectronics Technology Co., Ltd., Shenzhen, Guangdong (CN)

(72) Inventors: Wei Chen, Shenzhen (CN); Xinhong Chen, Shenzhen (CN); Hua Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 195 days.

(21) Appl. No.: 13/811,404

(22) PCT Filed: Dec. 21, 2012

(86) PCT No.: PCT/CN2012/087203
§ 371 (c)(1),
(2) Date: Jan. 22, 2013

(87) PCT Pub. No.: WO2014/089877
PCT Pub. Date: Jun. 19, 2014

(65) Prior Publication Data
US 2014/0167629 A1    Jun. 19, 2014

(51) Int. Cl.
*H05B 33/08* (2006.01)
*H05B 37/00* (2006.01)
*G02F 1/1335* (2006.01)

(52) U.S. Cl.
CPC .............. *G02F 1/133603* (2013.01); *G02F 2001/133612* (2013.01); *H05B 33/0815* (2013.01); *H05B 33/0857* (2013.01)

(58) Field of Classification Search
CPC .............. G02F 1/133603; H05B 33/0827
USPC .................. 315/186, 189, 192, 291
See application file for complete search history.

(56) References Cited

U.S. PATENT DOCUMENTS

2007/0080911 A1 * 4/2007 Liu et al. ............ 345/82
2008/0054815 A1 * 3/2008 Kotikalapoodi et al. ..... 315/192
(Continued)

FOREIGN PATENT DOCUMENTS

CN    2834022 Y    11/2006
CN    101916548 A * 12/2010 ............. G09G 3/34
(Continued)

OTHER PUBLICATIONS

English translation of CN101916548A.*
(Continued)

*Primary Examiner* — Douglas W Owens
*Assistant Examiner* — Pedro C Fernandez
(74) *Attorney, Agent, or Firm* — Andrew C. Cheng

(57) ABSTRACT

The present invention discloses a direct type LED backlight and a liquid crystal display thereof. The direct type LED backlight comprises a power converting circuit, which transfers an alternating current voltage generated from an external liquid crystal display into direct an current voltage and outputs it; multiple LED strings connected in parallel, wherein each LED string comprises a predetermined amount of LED connected in parallel, which receives a direct current from the power converting circuit; wherein, the predetermined amount is limited to that the direct current of the LED string emitting light normally is smaller than or equal to the direct current output from the power converting circuit. According to the direct type LED backlight of the present invention, it can avoid using a boost circuit in order to decrease circuit complexity and save costs.

14 Claims, 3 Drawing Sheets

(56) References Cited

U.S. PATENT DOCUMENTS

2011/0043138 A1* 2/2011 Hsu et al. .................. 315/297
2013/0127356 A1* 5/2013 Tanaka et al. ............ 315/200 R

FOREIGN PATENT DOCUMENTS

| CN | 201689651 U | 12/2010 |
| CN | 102682707 A | 9/2012 |
| CN | 202454225 U | 9/2012 |

OTHER PUBLICATIONS

English translation of CN102682707A.*

* cited by examiner

DIRECT TYPE LED BACKLIGHT AND LIQUID CRYSTAL DISPLAY THEREOF

BACKGROUND OF THE INVENTION

1. Field of the Invention

The present invention relates to the field of liquid crystal display, and in particular to a direct type LED backlight and a liquid crystal display thereof.

2. The Related Arts

With the continuous improvement of technology, the backlight technology of liquid crystal display is improved continuously. A traditional backlight of the liquid crystal display uses a cold cathode fluorescent lamp (CCFL). But CCFL backlight has some disadvantages of worse color reproduction, poor luminous efficiency, high discharge voltage, bad discharge feature at low temperature and taking long time to heat to achieve stable grayscale. At present, it has been developed using LED backlight technology.

LED backlight is mainly divided into direct type and edge type.

The direct type LED backlight denotes that LED is arranged at the back of the liquid crystal panel as backlight. The edge type LED backlight denotes that LED is arranged around the edge of the liquid crystal panel, in which the LED emits light through the light guide plate and to the entire display panel from the edge of the screen.

In the direct type LED backlight, multiple LED strings are arranged at the back of the liquid crystal panel, wherein each LED string comprises multiple LEDs connected in series. In order to drive each LED string, it needs a specific drive circuit to offer drive voltage to each LED string.

FIG. 1 is a schematic view illustrating a direct type LED backlight according to the known technology. As shown in FIG. 1, the driving circuit of the backlight comprises a power converting circuit 110, a boost circuit 120, and multiple LED strings 130.

The power converting circuit 110 is used to convert an AC voltage (such as 110 V or 220 V) into a DC voltage (such as 5 V, 12 V, or 24 V). Generally, there is only one power converting circuit 110 used for AC-DC conversion in a liquid crystal display, which is used as a DC power source for the various electrical components in the liquid crystal display.

The boost circuit 120 is used to boost the DC voltage output from the power converting circuit 110, to satisfy the need of driving each LED string 130. In the present technology, the needed voltage for each LED string 130 is higher than the DC voltage output from the power converting circuit 110, which needs the specific boost circuit 120 to boost. Because of the presence of the boost circuit 120, the circuits of the entire liquid crystal display become complicate, and the costs increase.

Therefore, a direct type LED backlight with simple and low-cost circuit structure is needed.

SUMMARY OF THE INVENTION

The purpose of the present invention is to provide a direct type LED backlight which is used in a liquid crystal display.

According to the present invention, it provides a direct type LED backlight, comprising: a power converting circuit, which transfers an alternating current voltage generated from an external liquid crystal display device into direct an current voltage and outputs it; multiple LED strings connected in parallel, wherein each LED string comprises a predetermined amount of LED connected in parallel, which receives a direct current from the power converting circuit; wherein, the predetermined amount is limited to that the direct current voltage of the LED string emitting light normally is smaller than or equal to the direct current voltage output from the power converting circuit.

Moreover, the predetermined amount of LED is connected in series to a first resistor within each LED string.

Moreover, the direct type LED backlight further comprises: a feed-back controlling circuit, which controls the power converting circuit to control the intensity of output direct current voltage according to the voltage across the first resistor.

Moreover, the feed-back controlling circuit controls the power converting circuit to increase the output voltage when the voltage across the first resistor in one of the multiple LED strings is smaller than a predetermined voltage threshold; the feed-back controlling circuit controls the power converting circuit to decrease the output voltage when the voltage across the first resistor in each LED string is larger than the predetermined voltage threshold.

Moreover, the predetermined voltage threshold is the voltage across the first resistor when the LED string emits light normally.

Moreover, no boost circuit exists in the direct type LED backlight.

Moreover, the power converting circuit comprises a primary coil, a secondary coil, a MOS transistor, a rectifying diode, and a first capacitor; wherein, the primary coil is connected in series to the MOS transistor, one end of the secondary coil is connected to the anode of the rectifying diode, the first capacitor is connected between the cathode of the rectifying diode and the other end of the secondary coil, and the gate of the MOS transistor is connected to the feed-back controlling circuit.

Moreover, the feed-back controlling circuit comprises: a first comparator, which compares the voltage across the first resistor of the multiple LED strings with the predetermined voltage threshold; a square-wave generator, which generates a square-wave signal; wherein, output a first level signal when the voltage across the first resistor of each LED string is larger than the predetermined voltage threshold; output a second level signal when the voltage across the first resistor in one of the multiple LED strings is smaller than the predetermined voltage threshold; wherein, a square-wave generator reduces the duty cycle of the square wave signal in response to the first level signal, the square-wave generator increases the duty cycle of the square-wave signal in response to the second level signal.

Moreover, the square-wave generator comprises: a second comparator, a triangular-wave generator, a second resistor, and a second capacitor, wherein, a first input terminal of the second comparator receives a triangular-wave signal from the triangular-wave generator, a second input terminal of the second comparator is connected to an output terminal of the first comparator, and the second resistor and the second capacitor connected in series to each other are connected to the second input terminal of the second comparator.

Moreover, the first level signal is a low level signal, and the second level signal is a high level signal.

According to the present invention, it further provides a liquid crystal display device, comprising a direct type LED backlight, wherein, the direct type LED backlight comprises: a power converting circuit, which transfers an alternating current voltage generated from an external liquid crystal display device into direct an current voltage and outputs it; multiple LED strings connected in parallel, wherein each LED string comprises a predetermined amount of LED connected in parallel, which receives a direct current from the power converting circuit; wherein, the predetermined amount is limited to that the direct current of the LED string emitting light normally is smaller than or equal to the direct current output from the power converting circuit; wherein the predetermined amount of LED is connected in series to a first resistor within each LED string; a feed-back controlling circuit, which controls the power converting circuit to control the intensity of output direct current voltage according to the voltage across the first resistor; wherein, the feed-back controlling circuit controls the power converting circuit to increase the output voltage when the voltage across the first resistor in one of the multiple LED strings is smaller than a predetermined voltage threshold; the feed-back controlling circuit controls the power converting circuit to decrease the output voltage when the voltage across the first resistor in each LED string is larger than the predetermined voltage threshold.

Moreover, the predetermined voltage threshold is the voltage across the first resistor when the LED string emits light normally.

Moreover, no boost circuit exists in the direct type LED backlight.

Moreover, the power converting circuit comprises a primary coil, a secondary coil, a MOS transistor, a rectifying diode, and a first capacitor; wherein, the primary coil is connected in series to the MOS transistor, one end of the secondary coil is connected to the anode of the rectifying diode, the first capacitor is connected between the cathode of the rectifying diode and the other end of the secondary coil, and the gate of the MOS transistor is connected to the feed-back controlling circuit.

Moreover, the feed-back controlling circuit comprises: a first comparator, which compares the voltage across the first resistor of the multiple LED strings with the predetermined voltage threshold; a square-wave generator, which generates a square-wave signal; wherein, output a first level signal when the voltage across the first resistor of each LED string is larger than the predetermined voltage threshold; output a second level signal when the voltage across the first resistor in one of the multiple LED strings is smaller than the predetermined voltage threshold; wherein, a square-wave generator reduces the duty cycle of the square wave signal in response to the first level signal, the square-wave generator increases the duty cycle of the square-wave signal in response to the second level signal.

Moreover, the square-wave generator comprises: a second comparator, a triangular-wave generator, a second resistor, and a second capacitor, wherein, a first input terminal of the second comparator receives a triangular-wave signal from the triangular-wave generator, a second input terminal of the second comparator is connected to an output terminal of the first comparator, and the second resistor and the second capacitor connected in series to each other are connected to the second input terminal of the second comparator.

Moreover, the first level signal is a low level signal, and the second level signal is a high level signal.

The direct type LED backlight according to the present invention can avoid using a boost circuit in order to decrease circuit complexity and save costs.

Additional aspects and/or advantages of the present invention are illustrated in the following description, and the part of the description will also be illustrated or learned by the embodiment of the present invention.

BRIEF DESCRIPTION OF THE DRAWINGS

By illustrating the accompanying drawings and the detailed descriptions as follows, the objects, the features and the advantages of the present invention will become more apparent, wherein.

DETAILED DESCRIPTION OF THE PREFERRED EMBODIMENTS

Now, the various exemplary embodiments are fully described referring to the accompanying drawings, wherein some of the exemplary embodiments are shown in the accompanying drawings.

Figure 1:
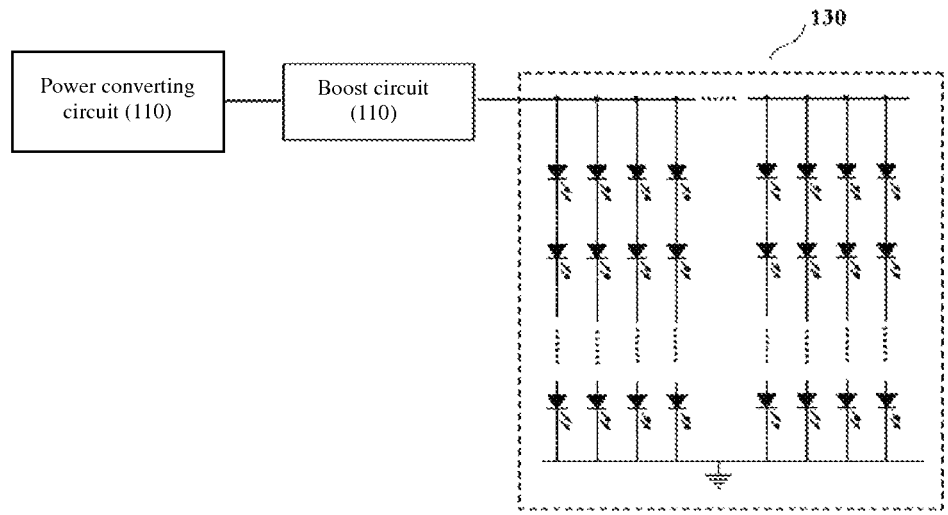
FIG. 1 is a schematic view illustrating a direct type LED backlight according to the known technology.
Figure 2:
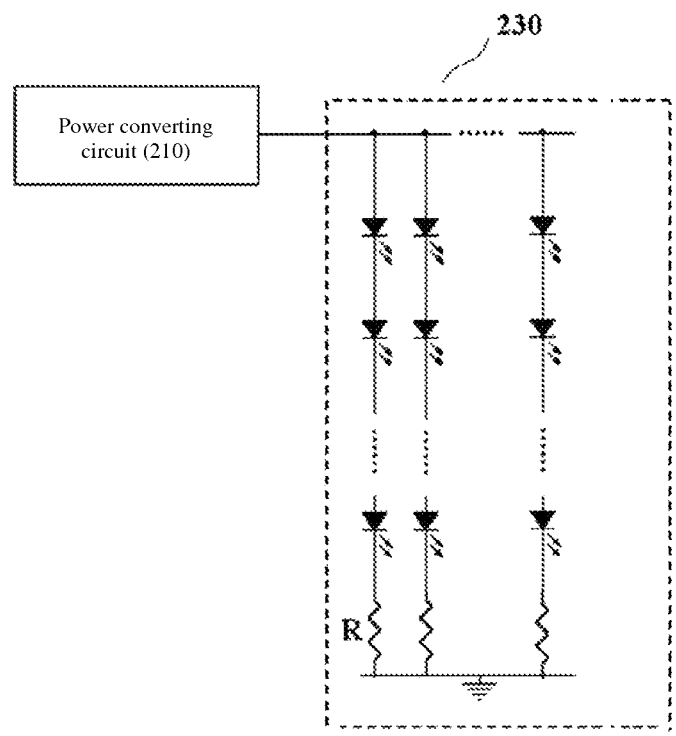
FIG. 2 is a schematic view illustrating a direct type LED backlight according to the embodiment of the present invention.

FIG. 2 is a schematic view illustrating a direct type LED backlight according to the embodiment of the present invention.

As shown in FIG. 2, a direct type LED backlight according to the embodiment of the present invention comprises: a power converting circuit 210 and multiple LED strings 230.

The power converting circuit 210 converts AC voltage (such as 110V or 220V) into DC voltage (such as 24V). Here, the power converting circuit 210 is an AC-DC converting circuit used to supply DC voltage to all DC components in the liquid crystal display.

The multiple LED strings 230 are provided at the back of the liquid crystal panel of the liquid crystal display as a backlight, wherein each LED string comprises multiple LEDs connected in series and a resistor R. The multiple LED strings 230 receive the direct current voltage from the power converting circuit 110. The amount N (N is integer and larger than zero.) of LEDs in each LED string 230 is defined by the following an equation:

$$N \times Vd \leq Vs,$$

wherein, Vd is the light-emitting voltage of each LED, Vs is the output voltage of the power converting circuit 110. For example, when Vd is 6.5 V and Vs is equal to 24 V, N is less or equal to 3.

Moreover, when the power converting circuit 110 can output multiple DC voltages (such as 5 V, 12 V or 24 V at the same time), Vs is preferably the maximum DC voltage (such as 24 V) within the multiple DC voltages output from the power conversion circuit 110.

In addition, the amount of the LEDs in each LED string is preferably the same.

Alternatively, each LED string may not comprise the resistor R.

Figure 3:
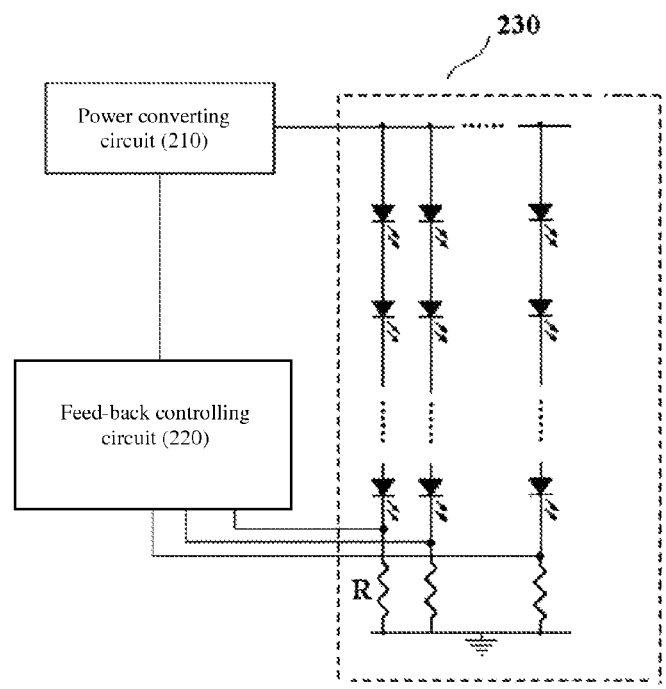
FIG. 3 is a schematic view illustrating a direct type LED backlight according to another embodiment of the present invention.

FIG. 3 is a schematic view illustrating a direct type LED backlight according to another embodiment of the present invention.

As shown in FIG. 3, the embodiment of the direct type LED backlight according to the present invention comprises: a power converting circuit 210, a feed-back controlling circuit 220 and multiple LED strings 230.

Comparing with the embodiment in FIG. 2, the embodiment in FIG. 3 further provides a feed-back controlling circuit 220. The feed-back controlling circuit 220 controls the output voltage of the power converting circuit 110 according to the feed-back voltage of the LED string to stabilize the power for the LED string.

The feed-back voltage of the LED string is the voltage across the resistor R in each LED string. The feed-back controlling circuit 220 compares the minimal feed-back voltage within the feed-back voltages of the multiple LED strings 230 with the predetermined voltage threshold Va. The predetermined voltage threshold Va is the voltage across the resistor R when the LED string emits light normally, which is provided inside the feed-back controlling circuit 220. When the minimal feed-back voltage is smaller than the predetermined voltage, the feed-back controlling circuit 220 outputs a controlling signal to control the power converting circuit 210 to increase the output voltage. When the minimal feed-back controlling voltage is larger than the predetermined voltage, the feed-back controlling circuit 220 outputs a controlling signal to control the power converting circuit 210 to decrease the output voltage. It can be understood that when the minimal feed-back controlling voltage is equal to the predetermined voltage, the feed-back controlling circuit 220 does not control the voltage output of the power converting circuit 210 (ex. not output the controlling signal) or controls the power converting circuit 210 to maintain the present voltage output.

The AC-DC converting circuit of the present technology and the feed-back controlling circuit thereof can be used to realize the power converting circuit 210 and the feed-back controlling circuit 220 in the prevent invention.

Figure 4:
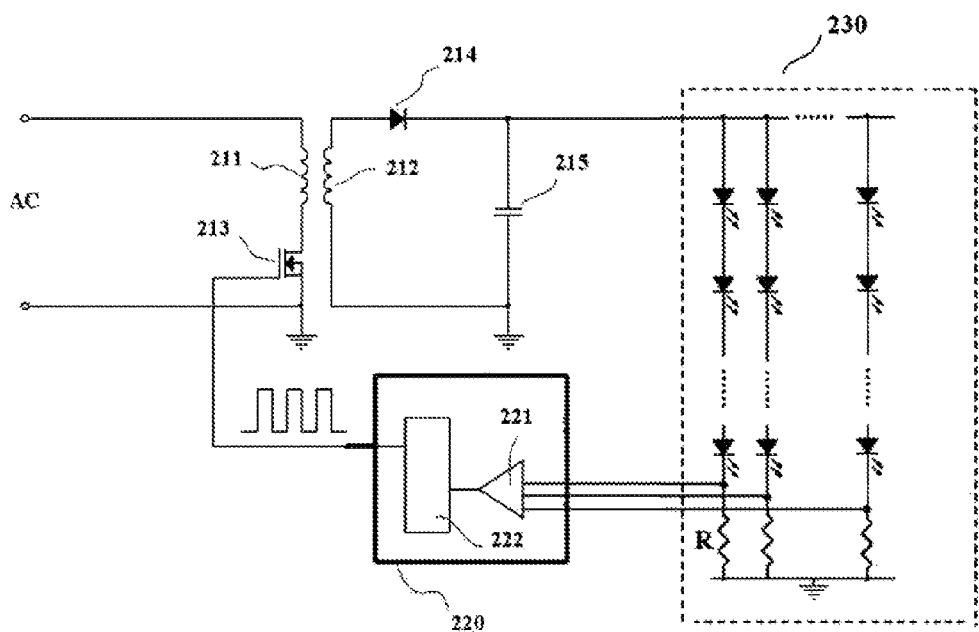
FIG. 4 is a schematic view illustrating a power converting circuit and a feed-back controlling circuit of the direct type LED backlight according to the embodiment of the present invention.

The power converting circuit 210 and the feed-back controlling circuit 220 according to one embodiment of the prevent invention referring to FIG. 4 are as follow.

FIG. 4 is a schematic view illustrating the power converting circuit 210 and the feed-back controlling circuit 220 of the direct type LED backlight according to the embodiment of the present invention.

As shown in FIG. 4, the power converting circuit 210 according to the present invention comprises a primary coil 211, a secondary coil 212, a metal oxide semiconductor (MOS) transistor 213, a rectifying diode 214 and a capacitor 215.

The primary coil 211 and the MOS transistor 213 are connected in series. One end of the secondary coil 212 is connected to the anode of the rectifying diode 214, and the capacitor 215 is connected between the cathode of the rectifying diode 214 and the other end of the secondary coil 212.

By controlling the gate of the MOS transistor 213 connected in series to the primary coil 211, it can control the intensity of output voltage generated from the power converting circuit 210.

The feed-back controlling circuit 220 according to the present invention comprises a comparator 221 and a square-wave generator 222.

The comparator 221 compares the feed-back voltage of the multiple LED strings 230 with the predetermined voltage threshold Va. When the feed-back voltages of the multiple LED strings 230 are larger than the predetermined voltage threshold Va, output a first level signal; when one of the feed-back voltages of the multiple LED strings 230 is smaller than the predetermined voltage threshold Va, output a second level signal. The square-wave generator 222 can reduce the duty cycle of the square wave signal in response to the first level signal output from the comparator 221, so that the output voltage of the power converting circuit 210 is decreased. Moreover, the square-wave generator 222 increases the duty cycle of the square-wave signal in response to the second level signal output from the comparator 221, so that the output voltage of the power converting circuit 210 is boosted.

It can be understood that the first level signal can be a low level signal; the second level signal can be a high level signal; or the first level signal can be a high level signal; the second level signal can be a low level signal.

Figure 5:
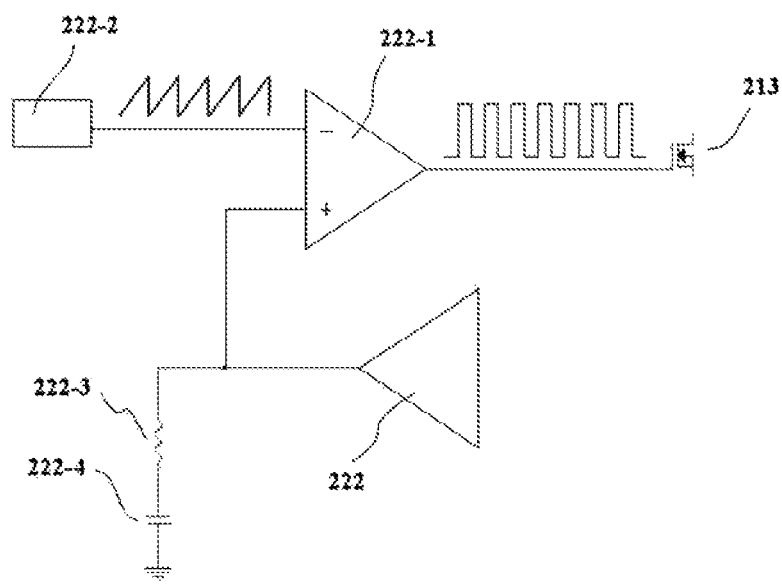
FIG. 5 is a schematic view illustrating a square-wave generator according to the embodiment of the present invention.

FIG. 5 is a schematic view illustrating a square-wave generator 222 according to the embodiment of the present invention.

As shown in FIG. 5, the square-wave generator 222 comprises: a comparator 222-1, a triangular-wave generator 222-2, a resistor 222-3, and a capacitor 222-4.

Wherein, a first input terminal (such as a negative input terminal) of the comparator 222-1 receives a triangular-wave signal from the triangular-wave generator 222-2; a second input (such as a positive input terminal) of the comparator 222-1 is connected to an output terminal of the comparator 221; and the resistor 222-3 and the capacitor 222-4 connected in series to each other are connected to the second input terminal of the comparator 222-1.

When the comparator 221 outputs the second level signal with high voltage, the resistor 222-3 and the capacitor 222-4 are charged. The input voltage of the second input terminal of the comparator 222-1 is gradually increased. Because the gradually increased input voltage in the comparator 222-1 is tangent to the triangular-wave signal output from the triangular-wave generator 222-2, the comparator 222-1 outputs the square-wave signal with a gradually increased duty cycle. Meanwhile, the duty cycle of the square-wave signal is gradually increased, so that the output voltage of the power converting circuit 210 is gradually increased accordingly.

When the comparator 221 outputs the second level signal with low voltage, the input voltage of the second input terminal of the comparator 222-1 is gradually decreased. Because the gradually decreased input voltage in the comparator 222-1 is tangent to a triangular-wave signal output from the triangular-wave generator 222-2, the comparator 222-1 outputs the square-wave signal with a gradually decreased duty cycle. Meanwhile, the duty cycle of the square-wave signal is gradually decreased, so that the output voltage of the power converting circuit 210 is gradually decreased accordingly.

Although FIG. 5 shows the square-wave generator 222 according to an embodiment of the present invention, the present invention is not limited thereto. We also can use the square-wave generator with the duty cycle of the other output square-wave signal.

The direct type LED backlight according to the present invention can avoid using the boost circuit in order to decrease circuit complexity and save costs.

The present invention referring to the exemplary embodiment is specifically described and illuminated, but those having ordinary skills in the art should understand that it can changed in various forms and details without departing from the spirit and scope of the claim defined by the present invention.

What is claimed is:
1. A direct type LED backlight, comprising:
a power converting circuit, which converts an alternating voltage generated from an external liquid crystal display into a direct voltage and outputs it;
multiple LED strings connected in parallel, wherein each LED string comprises a predetermined amount of LEDs connected in series, which receives the direct voltage from the power converting circuit; and
a feed-back controlling circuit, which controls the power converting circuit to control an intensity of output of the direct voltage according to a voltage across the first resistor;

wherein, the feed-back controlling circuit comprises:
a first comparator, which compares the voltage across the first resistor of the multiple LED strings with a predetermined voltage threshold; and
a square-wave generator, which generates a square-wave signal;
wherein output a first level signal when the voltage across the first resistor of each LED string is larger than the predetermined voltage threshold; output a second level signal when the voltage across the first resistor in one of the multiple LED strings is smaller than the predetermined voltage threshold;
wherein, the square-wave generator reduces the duty cycle of the square wave signal in response to the first level signal, the square-wave generator increases the duty cycle of the square-wave signal in response to the second level signal;
wherein, the predetermined amount is limited so that a direct voltage of the LED string emitting light normally is smaller than or equal to the direct voltage output from the power converting circuit.

2. The direct type LED backlight as claimed in claim 1, wherein the predetermined amount of LED is connected in series to a first resistor within each LED string.

3. The direct type LED backlight as claimed in claim 1, wherein the feed-back controlling circuit controls the power converting circuit to increase the output voltage when the voltage across the first resistor in one of the multiple LED strings is smaller than a predetermined voltage threshold; the feed-back controlling circuit controls the power converting circuit to decrease the output voltage when the voltage across the first resistor in each LED string is larger than the predetermined voltage threshold.

4. The direct type LED backlight as claimed in claim 3, wherein the predetermined voltage threshold is the voltage across the first resistor when the LED string emits light normally.

5. The direct type LED backlight as claimed in claim 1, wherein no boost circuit exists in the direct type LED backlight.

6. The direct type LED backlight as claimed in claim 1, wherein the power converting circuit comprises a primary coil, a secondary coil, a MOS transistor, a rectifying diode, and a first capacitor; wherein, the primary coil is connected in series to the MOS transistor, one end of the secondary coil is connected to the anode of the rectifying diode, the first capacitor is connected between the cathode of the rectifying diode and the other end of the secondary coil, and the gate of the MOS transistor is connected to the feed-back controlling circuit.

7. The direct type LED backlight as claimed in claim 1, wherein the square-wave generator comprises: a second comparator, a triangular-wave generator, a second resistor, and a second capacitor,
wherein, a first input terminal of the second comparator receives a triangular-wave signal from the triangular-wave generator, a second input terminal of the second comparator is connected to an output terminal of the first comparator, and the second resistor and the second capacitor connected in series to each other are connected to the second input terminal of the second comparator.

8. The direct type LED backlight as claimed in claim 1, wherein the first level signal is a low level signal, and the second level signal is a high level signal.

9. A liquid crystal display, comprising a direct type LED backlight, wherein, the direct type LED backlight comprises:

a power converting circuit, which converts an alternating voltage generated from an external liquid crystal display into a direct voltage and outputs it;
multiple LED strings connected in parallel, wherein each LED string comprises a predetermined amount of LEDs connected in series, which receives the direct voltage from the power converting circuit; wherein, the predetermined amount is limited so that a direct voltage of the LED string emitting light normally is smaller than or equal to the direct voltage output from the power converting circuit;
wherein the predetermined amount of LED is connected in series to a first resistor within each LED string;
a feed-back controlling circuit, which controls the power converting circuit to control an intensity of output of the direct voltage according to a voltage across the first resistor;
wherein, the feed-back controlling circuit comprises:
a first comparator, which compares the voltage across the first resistor of the multiple LED string s with a predetermined voltage threshold; and
a square-wave generator, which generates a square-wave signal;
wherein, output a first level signal when the voltage across the first resistor of each LED string is larger than the predetermined voltage threshold; output a second level signal when the voltage across the first resistor in one of the multiple LED strings is smaller than the predetermined voltage threshold;
wherein, the square-wave generator reduces the duty cycle of the square wave signal in response to the first level signal the square-wave generator increases the duty cycle of the square-wave signal in response to the second level signal;
wherein, the feed-back controlling circuit controls the power converting circuit to increase the output voltage when the voltage across the first resistor in one of the multiple LED strings is smaller than a predetermined voltage threshold; the feed-back controlling circuit controls the power converting circuit to decrease the output voltage when the voltage across the first resistor in each LED string is larger than the predetermined voltage threshold.

10. The liquid crystal display as claimed in claim 9, wherein the predetermined voltage threshold is the voltage across the first resistor when the LED string emits light normally.

11. The liquid crystal display as claimed in claim 9, wherein no boost circuit exists in the direct type LED backlight.

12. The liquid crystal display as claimed in claim 9, wherein the power converting circuit comprises a primary coil, a secondary coil, a MOS transistor, a rectifying diode, and a first capacitor; wherein, the primary coil is connected in series to the MOS transistor, one end of the secondary coil is connected to the anode of the rectifying diode, the first capacitor is connected between the cathode of the rectifying diode and the other end of the secondary coil, and the gate of the MOS transistor is connected to the feed-back controlling circuit.

13. The liquid crystal display as claimed in claim 9, wherein the square-wave generator comprises: a second comparator, a triangular-wave generator, a second resistor, and a second capacitor,
wherein, a first input terminal of the second comparator receives a triangular-wave signal from the triangular-wave generator, a second input terminal of the second comparator is connected to an output terminal of the first comparator, and the second resistor and the second capacitor connected in series to each other are connected to the second input terminal of the second comparator.

14. The liquid crystal display as claimed in claim 9, wherein the first level signal is a low level signal, and the second level signal is a high level signal.

* * * * *